US009278600B2

(12) United States Patent
Slater

(10) Patent No.: US 9,278,600 B2
(45) Date of Patent: Mar. 8, 2016

(54) ACTIVE ROAD NOISE CONTROL SYSTEM

(71) Applicant: Jaguar Land Rover Limited, Whitley Coventry Warwickshire (GB)

(72) Inventor: Barry Slater, Conventry (GB)

(73) Assignee: Jaguar Land Rover Limited, Whitley, Coventry, Warwickshire (GB)

( * ) Notice: Subject to any disclaimer, the term of this patent is extended or adjusted under 35 U.S.C. 154(b) by 0 days.

(21) Appl. No.: 14/372,935

(22) PCT Filed: Jan. 17, 2013

(86) PCT No.: PCT/EP2013/050854
§ 371 (c)(1),
(2) Date: Jul. 17, 2014

(87) PCT Pub. No.: WO2013/107823
PCT Pub. Date: Jul. 25, 2013

(65) Prior Publication Data
US 2015/0028549 A1    Jan. 29, 2015

(30) Foreign Application Priority Data
Jan. 20, 2012 (GB) .................................. 1200935.3

(51) Int. Cl.
| B60G 17/015 | (2006.01) |
| B60G 17/019 | (2006.01) |
| B60G 7/00 | (2006.01) |
| B60G 7/02 | (2006.01) |
| B60G 13/16 | (2006.01) |
| F16F 7/10 | (2006.01) |

(52) U.S. Cl.
CPC .......... *B60G 17/01908* (2013.01); *B60G 7/006* (2013.01); *B60G 7/02* (2013.01); *B60G 13/16* (2013.01); *F16F 7/1005* (2013.01); *B60G 2202/25* (2013.01)

(58) Field of Classification Search
USPC .......... 280/5.515, 5.516, 5.517, 5.518, 5.519, 280/124.109, 124.18
See application file for complete search history.

(56) References Cited

U.S. PATENT DOCUMENTS

| 5,337,864 | A | 8/1994 | Sjostrom | |
| 5,392,882 | A | 2/1995 | Mackovjak et al. | |
| 6,000,703 | A * | 12/1999 | Schubert et al. | ............ 280/5.518 |
| 6,009,985 | A | 1/2000 | Ivers | |
| 6,032,770 | A | 3/2000 | Alcone et al. | |
| 6,113,120 | A * | 9/2000 | Heap | ...................... 280/124.135 |
| 7,357,402 | B2 * | 4/2008 | Berghus et al. | ......... 280/124.109 |
| 7,810,819 | B2 * | 10/2010 | Lamers et al. | ............. 280/5.516 |
| 8,313,108 | B2 * | 11/2012 | Ac et al. | ......................... 280/5.5 |
| 2002/0113351 | A1 | 8/2002 | Kato et al. | |
| 2003/0001346 | A1 * | 1/2003 | Hamilton et al. | .......... 280/5.515 |
| 2005/0189735 | A1 * | 9/2005 | Berghus et al. | ......... 280/124.109 |
| 2006/0169518 | A1 | 8/2006 | Thomas et al. | |

FOREIGN PATENT DOCUMENTS

| DE | 102 27 888 A1 | 1/2004 |
| DE | 103 29 037 A1 | 1/2005 |
| JP | 2007269154 A | 10/2007 |
| JP | 2008307955 A | 12/2008 |
| WO | WO 99/38153 A1 | 7/1999 |

OTHER PUBLICATIONS

International Search Report for application No. PCT/EP2013/050854, dated May 15, 2013, 4 pages.
Great Britain Combined Search and Examination Report for application No. GB1200935.3, dated May 11, 2012, 6 pages.
Japanese Office action corresponding to JP application No. 2014552623, dated Sep. 29, 2015, with English language summary, 6 pages.

* cited by examiner

*Primary Examiner* — Toan To
(74) *Attorney, Agent, or Firm* — Reising Ethington P.C.

(57) ABSTRACT

An active road noise control system for a vehicle (10) comprising one or more inertial actuators (30) for suppressing vibrations in the chassis of the vehicle (10) and/or vehicle body (8).

11 Claims, 7 Drawing Sheets

ACTIVE ROAD NOISE CONTROL SYSTEM

TECHNICAL FIELD

The present invention relates to an active road noise control system and a method for controlling road noise in a vehicle. Aspects of the invention relate to a system, to a vehicle and to a method.

BACKGROUND

Land based vehicles when driven upon highways and other surfaces generate low frequency noise known as road noise. As the wheels are driven over the road surface, such road noise is at least in part structure borne. That is to say, it is transmitted through vehicle components such as tyres, wheels, hubs, chassis components, suspension components such as suspension control arms or wishbones, dampers, anti-roll or sway bars and the vehicle body and can be heard in the vehicle cabin.

It is desirable to reduce the road noise experienced by occupants of the vehicle cabin.

The present invention seeks to reduce the vibrations in the vehicle components and hence road noise experienced by cabin occupants.

SUMMARY

The present invention seek to overcome or at least mitigate the problems of the prior art.

Aspects of the invention provide a system, a vehicle and a method as claimed in the appended claims.

According to an aspect of the present invention for which protection is sought, there is provided a vehicle comprising a vehicle body having a cabin and one or more wheels in rolling contact with a surface, the one or more wheels being coupled to the vehicle body by a chassis, and wherein at least one inertial actuator is mounted upon the chassis for suppression or cancellation of vibrations or noise in the chassis resulting from said rolling contact before transmission into the vehicle body or cabin.

One advantage of this, is that the vibrations or noise in the chassis coupling the wheels to the vehicle body are suppressed or reduced before transmission into the vehicle body.

Cancelling the vibrations at source is advantageous, because, as the vibrations travel from component to component through the vehicle, they typically become more complex. A single axis vibration in the chassis may be transmitted to the vehicle body at multiple points and produce a complex, multiple axis vibration in the vehicle body. This occurs in part because of the complex fittings between the chassis and the vehicle body. Similarly, the orientation of the vibrations in the chassis is more predictable, and the inertial actuators can be mounted so as to best reduce vibrations in the expected directions.

Optionally, the at least one inertial actuator is arranged to reduce or suppress vibrations or noise below the frequency of 500 Hz.

Optionally, the at least one inertial actuator is arranged to reduce or suppress vibrations or noise above the frequency of 20 Hz.

Additionally or alternatively, one or more inertial actuators are placed upon the vehicle body adjacent to a coupling or joint between supports or control arms of the chassis and the vehicle body.

In one embodiment the chassis comprises one or more components for coupling the wheels to the vehicle body and wherein the inertial actuators are placed on one or more or all of the components which are directly coupled to the vehicle body. This has the advantage that vibrations present in the chassis are suppressed, reduced or eliminated before being transmitted or transferred into the vehicle.

Optionally, the vehicle is a land based vehicle such as a car, van or truck.

In further embodiment the vehicle comprises two or more inertial actuators mounted upon a support element, each of the two or more inertial actuators being disposed at an angular relationship with respect to one another, the support element being secured to a component of the vehicle chassis or vehicle body.

Optionally, the two or more inertial actuators are disposed perpendicularly with respect to one another and are mounted upon orthogonal faces of the support element.

According to another aspect of the present invention for which protection is sought there is provided a method of reducing the structure borne road noise audible in a vehicle cabin comprising:

providing a vehicle having one or more wheels coupled to a vehicle body by a chassis, the chassis being coupled to the vehicle body by a couple or joint;

securing one or more inertial actuators comprising a mass to the chassis and or to a portion of the vehicle body adjacent to the or each couple or joint;

actuating the mass of the inertial actuator with a transducer thereby applying a force to the chassis and/or a vehicle body, thereby reducing of suppressing vibrations in one or more components of the chassis and/or vehicle body.

According to a further aspect of the present invention for which protection is sought, there is provided a vehicle comprising a vehicle body having a cabin and one or more wheels in rolling contact with a surface, the one or more wheels being moveably coupled to the vehicle body by one of more supports wherein at least one inertial actuator is mounted upon at least one or each of said one or more supports for suppression or cancellation of vibration or noise in the supports so as to reduce the vibration or noise transmitted into the vehicle body, thereby to reduce audible road noise in the cabin.

Optionally, one or more inertial actuators are placed upon the vehicle body adjacent to a couple or joint between the one or more supports and the vehicle body.

According to a still further aspect of the present invention, for which protection is sought, there is provided an active road noise reduction system for a vehicle comprising a vehicle body having a cabin and one or more wheels in rolling contact with a surface, the one or more wheels being coupled to the vehicle body by a chassis, the system comprising at least one inertial actuator is mounted upon the chassis for suppression or cancellation of vibrations or noise in the chassis resulting from said rolling contact before transmission into the vehicle body or cabin.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features described in connection with one embodiment are applicable to all embodiments unless there is incompatibility of features.

BRIEF DESCRIPTION OF THE DRAWINGS

Embodiments of the invention will now be described, by way of example only, with reference to the accompanying Figures, in which.

DETAILED DESCRIPTION

Detailed descriptions of specific embodiments of the active road noise control system and method are disclosed herein. It will be understood that the disclosed embodiments are merely examples of the way in which certain aspects of the invention can be implemented and do not represent an exhaustive list of all of the ways the invention may be embodied. Indeed, it will be understood that the active road noise control system and method described herein may be embodied in various and alternative forms. The figures are not necessarily to scale and some features may be exaggerated or minimised to show details of particular components. Well-known components, materials or methods are not necessarily described in great detail in order to avoid obscuring the present disclosure. Any specific structural and functional details disclosed herein are not to be interpreted as limiting, but merely as a basis for the claims and as a representative basis for teaching one skilled in the art to variously employ the invention.

Figure 1:
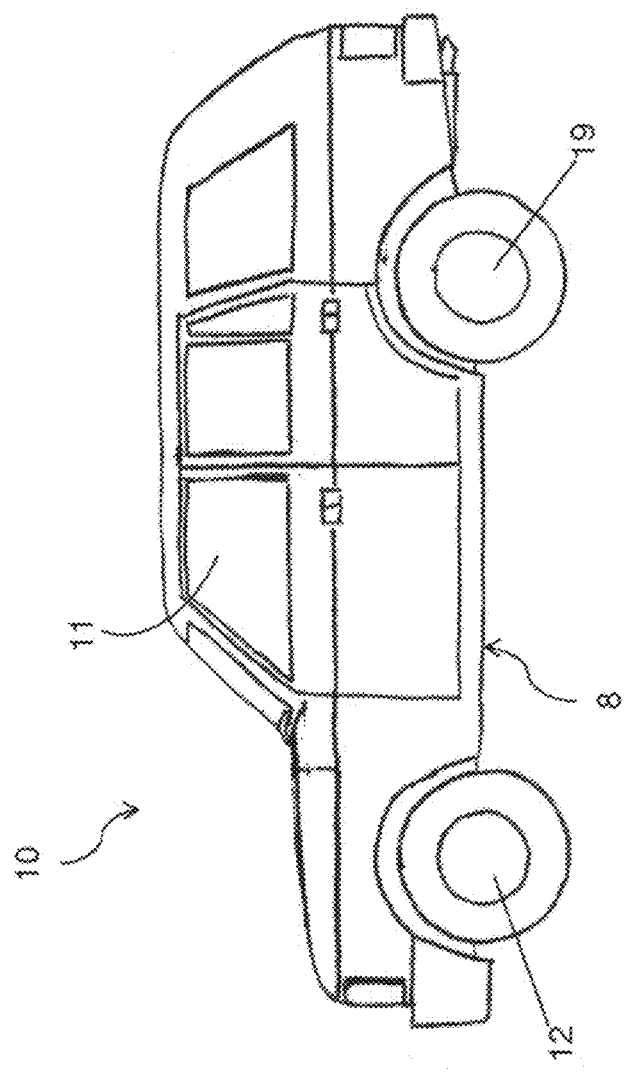
FIG. 1 is a side view of a vehicle comprising an active noise control system according to an embodiment of the invention.
Figure 2:
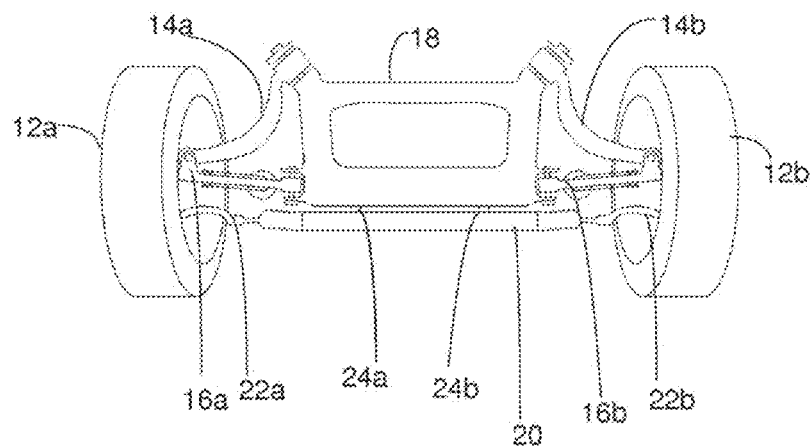
FIG. 2 is a plan view from below of a front portion of the underside of the vehicle according to the embodiment of FIG. 1.

Referring to FIG. 1 there is shown a vehicle 10 comprising an active road noise control system according to an embodiment of the invention. FIG. 2 shows a plan view of a front portion of an underside of the vehicle 10.

The vehicle 10 comprises a pair of front wheels 12 and a pair of rear wheels 19, a cabin 11 and a vehicle body 8. The front and rear wheels 12, 18 are coupled to the vehicle body 8 by a vehicle chassis.

Vehicle chassis as used herein relates to any component which couples the front and/or rear wheels 12, 19 to the vehicle body 8 and can articulate or move relative to the vehicle body 8.

The vehicle chassis may comprise, but is not exclusively limited to control arms, wishbones, sub-frames, dampers, springs, struts, wheel hubs, knuckles, anti-roll bars or anti-sway bars, and/or steering components such as a steering rack.

Each front wheel 12a, 12b (see FIG. 2) is mounted on a wheel hub (not shown for clarity) each wheel hub is coupled to the sub-frame 18 by a first lower control arm 14a, 14b and by a second lower control arm 16a, 16b. Optionally, the first and second control arms 14a, 14b, 16a, 16b are coupled to the wheel hubs by a ball joint (also not shown).

The first lower control arm 14a, 14b is also pivotally coupled to the sub-frame 18 and may comprise optional bushes.

The second lower control arm 16a, 16b is also pivotally coupled to the sub-frame 18 and may comprise optional bushes.

Figure 6:
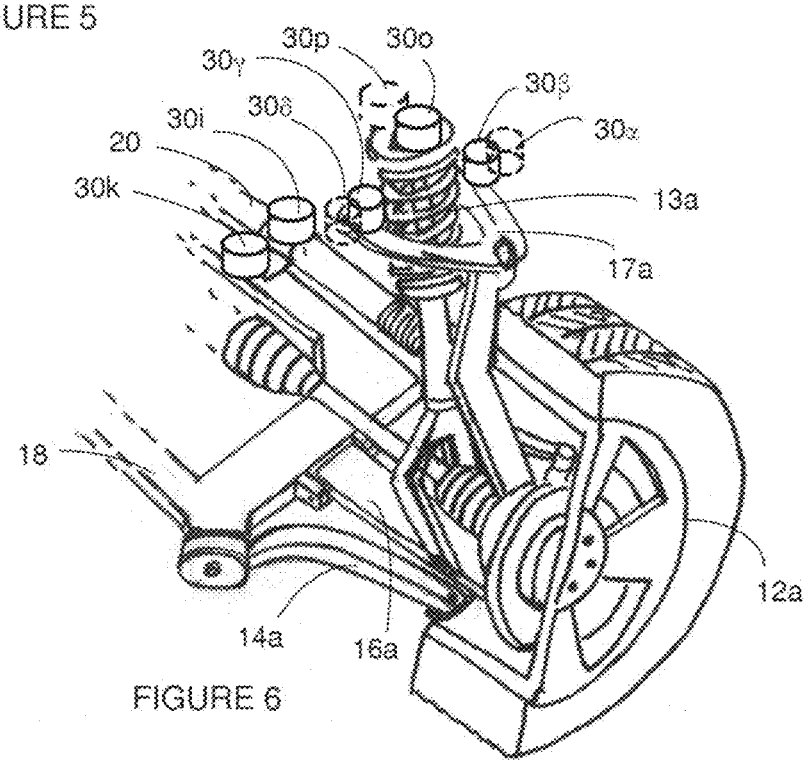
FIG. 6 is an illustration of the front wheel suspension system, a double wishbone suspension system comprising the active noise control system according to an embodiment and illustrates placement of the inertial actuators of FIG. 4.

The vehicle 10 also comprises one or more upper control arms 17a to form a double wishbone suspension configuration as shown in FIG. 6. The upper control arms 17a is pivotally coupled to the sub-frame 18 and may comprise optional bushes.

A coil over damper 13a comprising a coil spring and damper (shown in FIG. 6) is coupled to the lower control arms 14a/16a; 14b/16b or to the wheel hub, at its base and to the sub-frame 18, or body 8, at the top.

Figure 7:
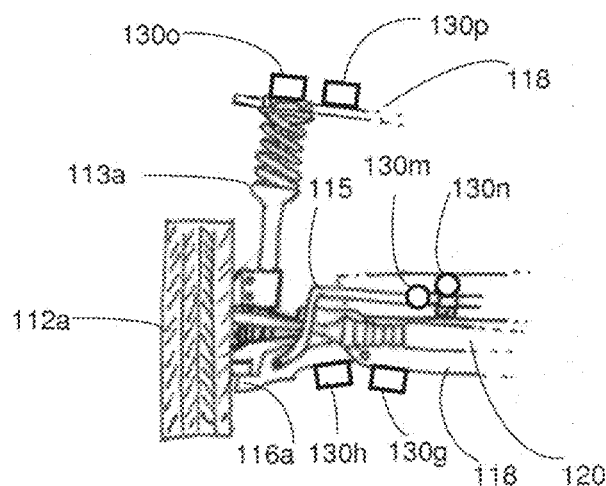
FIG. 7 illustrates an alternative suspension system, a Macpherson strut suspension system, according to another embodiment of the invention.

In an alternative illustrated embodiment as shown in FIG. 7, the upper control arm is formed from a Macpherson strut 113a formed from coil over damper comprising a coil spring and damper. It is envisaged that in other embodiments the vehicle to may comprise alternative suspension designs.

A steering mechanism or rack 20 is coupled between each of the front wheels 12a, 12b by link arms 22a, 22b and is mounted by bushes or supports 24a, 24b to the sub-frame 18.

Figure 3:
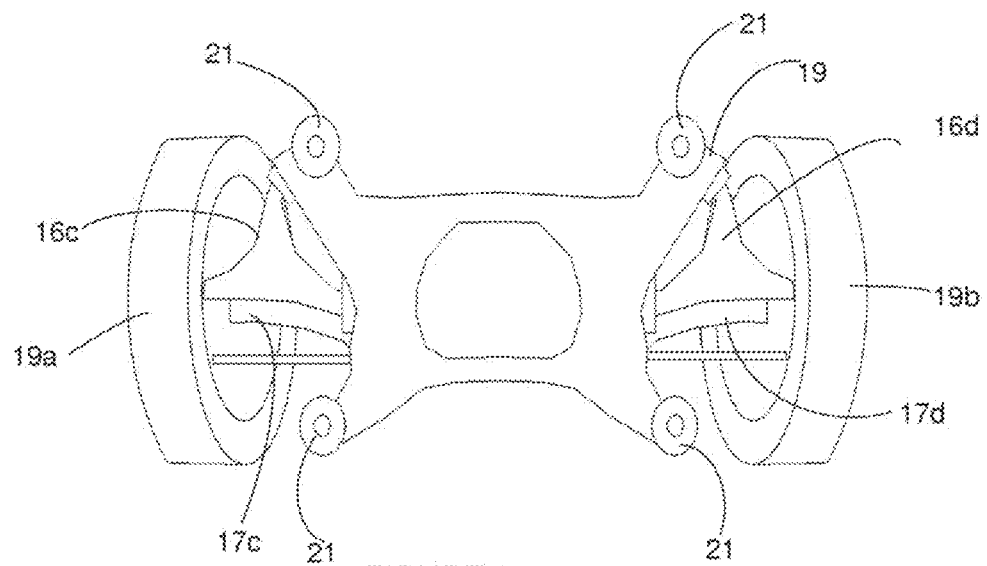
FIG. 3 is a plan view from below of a portion of a rear portion of the underside of the vehicle of FIG. 1.
Figure 9:
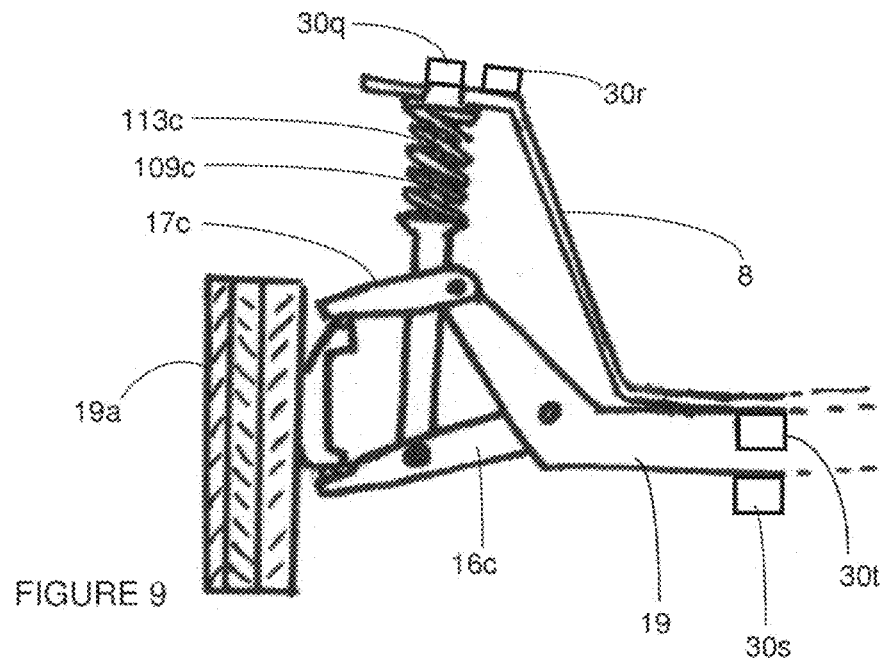
FIG. 9 illustrates the suspension system of the rear wheels of the vehicle of FIG. 1.

FIG. 3 illustrates a pair of rear wheels 19a, 19b coupled to a sub-frame 19, which in turn is coupled to the vehicle body 8. The rear wheels 19a, 19b are coupled to wheel hubs which are in turn coupled to the sub-frame 19 by lower control arms 16c, 16d, and by upper control arms 17c, 17d. Dampers 109c and springs 113c, (as shown in FIG. 9) are also provided and form a coil over damper 109c/113c; the spring 113c is a coil spring and the damper 109c is disposed within the spring 113c. The spring 113c is coupled to the sub-frame 19 (as shown in FIG. 9); in other embodiments the spring 113c may be coupled to the vehicle body 6. In the illustrated embodiment of FIG. 9 the damper 109c is also coupled to the vehicle body 8. In alternative embodiments if is envisaged that the spring 113c and/or damper 109c may be coupled to the sub-frame 19.

The sub-frame 19 is coupled to the vehicle body 8 by four mounting bushes 21.

In an alternative embodiment the coil over damper 13a, 109c/113c may be coupled between the upper control arms 17c, 17d and the sub-frame 19.

Figure 4:
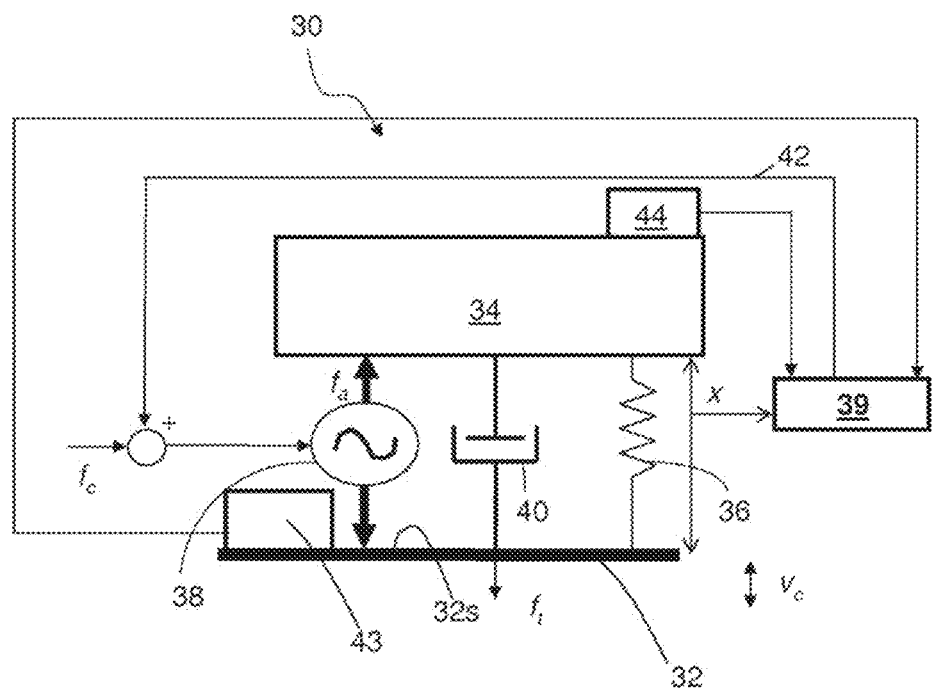
FIG. 4 is a schematic view of an inertial actuator.

FIG. 4 illustrates schematically an inertial actuator 30 that is known in the art; for example, as disclosed in WO2005/059397 to Elliot et al, the contents of which are incorporated herein by reference).

The inertial actuator 30 comprises an actuator chassis 32 upon which a mass 34 is supported by a spring 38. This mass 34 is driven by an external force generator 38; the external force generator 38 may comprise an electromagnetic circuit, such as a coil. A damper 40 is provided in parallel with the spring 38, or the damping may be inherent in the spring suspension system 38. The external force generator 38 is arranged to drive the mass 34 in a parallel direction relative to the orientation of the spring 36 and the damper 40.

The force generator 38 comprises a transducer which exerts a force (fa) upon the mass 34. A controller 39 is provided to control the excitation of the transducer. A feedback means 43, 44 is provided which is responsive to a measurement of acceleration of the mass 34 relative to the actuator chassis 32.

The controller 39 is operable to modify the excitation of the transducer in response to a feedback signal from the feedback means 43, 44.

The inertial actuator 80 can transmit a force (ft) into a surface 32s (see FIG. 9) of a component of the vehicle 10 upon which the actuator chassis 32 is mounted.

The inertial actuator 30 comprises an accelerometer or other suitable sensor on the actuator chassis 32 which measures the acceleration of the actuator chassis 32 experienced as a result of the vibrations in the vehicle component upon which it is mounted, together with another suitable sensor on the mass 34 which measures the acceleration of the mass. The measurement of the relative acceleration of the actuator chassis 32 compared to the acceleration of the mass 34 is used to create a vibration signal which it is desired be cancelled out by control of the external force generator 38 to drive the mass 34, thereby cancelling the vibrations in the vehicle component upon which the inertial actuator 30 is mounted.

When an external dynamic disturbance Vc is applied to the surface 32s on which the actuator chassis 32 is mounted, it causes a displacement of the actuator chassis 32 relative to the mass 34 on its spring 36 which can be measured as a relative acceleration. A sensor 44 supplies an electric signal proportional to the measured acceleration of the mass 34, and another sensor 43 supplies an electric signal proportional to the measured acceleration of the base 32.

The relative acceleration between the mass 34 and the base 32 is supplied to the controller 39 to determine how much cancellation force to apply, and the phase delay of that force.

In response, the controller 39 supplies an electrical feedback signal to the inertial actuator element 38 which drives the inertial mass 34 in such a way as to provide an opposing force at the actuator chassis 33, thereby reducing the original external dynamic disturbance Vc, and reducing the vibration, hence noise, transmitted to the vehicle interior.

The inertial actuator 30 may be mounted adjacent to a mounting location for a chassis component upon the surface of a chassis component of the chassis of the vehicle 10. Additionally or alternatively, the inertial actuators 30 may be mounted upon the sub-frame 18, 19 in which it is desired to control vibrations. The external force generator 38 can drive the mass 34 towards or away from a base plate of the actuator chassis 32 in a direction that is at least substantially perpendicular to said base plate.

The transmitted force (ft) can be utilized to manage vibrations by suppressing or reducing vibrations in the component upon which the inertial actuator 30 is mounted.

At low frequencies, below resonance, a displacement of the actuator chassis 32 results in a displacement of the mass 34 which substantially follows that of the actuator chassis 32. At higher frequencies, above resonance, the mass 34 will effectively be stationary or grounded since, due to its inertia, it cannot respond to the displacement of the actuator chassis 32. In this state the mass 34 can be used by to apply a force to the actuator chassis 32. The external force generator 38 applies a force to the mass 34 for example by applying a current to the coil of a frequency above resonance frequency of the actuator 30. A reaction force at the base pushes against the mass 34 which is effectively 'grounded' to create a cancellation force.

Optionally, the actuator 30 has a resonant frequency of around 80 Hz (the resonant frequency will depend on size or weight of the mass 34 and the stiffness of the spring 36), such that the actuator 30 has useable range of around 50-500 Hz.

The nature of the feedback signal 48 relative to the relative deflection (x) is detailed in the aforementioned patent WO2005/059397, and includes a self-levelling signal $f_c$ proportional to the integral of the displacement to overcome sag in the inertial actuator 30, and a signal proportional to the derivative of the displacement for behaviour control at resonance.

The inertial mass 34 (which it is envisaged will have magnetic properties) is supported on a spring. However, this means that the inertial mass 34 will sag on the spring 36 due to gravity and this limits the travel, hence effectiveness of the device. Application of a sufficient DC current to the external force generator 38 will raise the inertial mass 34 until it is back in a neutral position. The cancellation signal, AC current, required to cancel noise/vibrations is then applied on top of the DC current to create a total signal applied by the external force generator 38 to the inertial mass 34.

Figure 5:
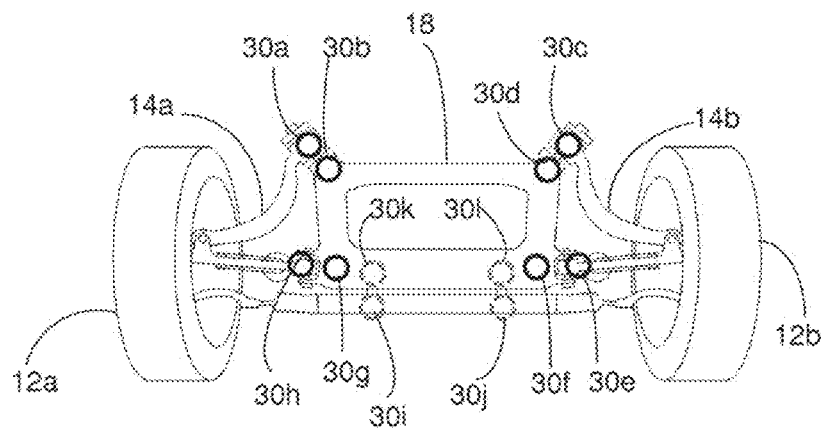
FIG. 5 corresponds to FIG. 2 and illustrates placement of the inertial actuators of FIG. 4 according to an embodiment of the invention.

FIGS. 5 and 6 illustrate placement of the inertial actuators (30, 30a, 30b, 30c, 30d, 30e, 30f, 30g, 30h, 30i, 30j, 30k, 30l, 30o, 30p, 30α, 30β, 30γ and 30δ) upon the chassis components of the front wheels 12a, 12b of the vehicle 10.

An inertial actuator 30a has optionally been placed upon the first lower control arm 14a, adjacent to the pivotal coupling between the first lower control arm 14a, and the sub-frame 18. It is envisaged that the coupling joints between the control arm 14a and the sub-frame 18 may comprise known passive devices for reducing vibration transmission such as bushes which may be made from rubber, polyurethane or other suitable material.

A second inertial actuator 30b may be placed on the sub-frame 18 adjacent to and in close proximity to the pivotal coupling between the sub-frame 18 and the first lower control arm 14a.

A third optional inertial actuator 30h is placed upon the second lower control arm 16a, optionally the inertial actuator 30h is placed adjacent to, or at the pivotal connection of the second lower control arm 16c to the sub-frame 18.

An optional fourth inertial actuator 30g may be placed upon the sub-frame 18 in close proximity to the pivotal connection between the second lower control arm 16a and the sub-frame 18.

With reference to the steering wheels for the vehicle 10, (typically the front wheels 12a, 12b) there is provided a steering mechanism 20 comprising steering arms 22a, 22b, in the illustrated embodiment a steering rack 20 is provided, however application of the invention to alternative steering mechanisms is envisaged.

The steering mechanism 20 may be coupled to the sub-frame 18 by one or more couplings joints 24a, 24b as shown in FIG. 3.

A fifth inertial actuator 30i is optionally placed upon the steering mechanism 20, optionally the inertial actuator 30i is placed on the steering mechanism 20 adjacent to a coupling joint 24a.

An optional sixth inertial actuator 30k may be placed upon the sub-fame 18, adjacent to and in close proximity to the coupling joint 24a.

In the illustrated embodiment the inertial actuators 30i, 30k are placed upon an upper surface of the sub-frame 18 and steering mechanism 20. However in other embodiments, the inertial actuators 30i, 30k may be placed upon the lower surface, as illustrated in FIG. 5, in dotted outline.

It is also envisaged that one or more of the inertial actuators 30a, 30b, 30g, 30h may be placed upon the upper surface of the respective one of the first or second control arms 14a, 16a and/or sub-frame 18. The indicated positioning illustrated represent only an optional positioning of the inertial actuators and other configurations are envisaged.

In particular it is envisaged that all the inertial actuators (30, 30a, 30b, 30c, 30d, 30e, 30f, 30g, 30h, 30i, 30j, 30k, 30l, 30o, 30p, 30α, 30β, 30γ and 30δ) may be placed upon the same surface for example all on the upper surface or all on the lower surface. This may have one or more benefits such as easier maintenance of the inertial actuators and/or better protection of the inertial actuators. It is also envisaged that the inertial actuators (30, 30a, 30b, 30c, 30d, 30e, 30f, 30g, 30h, 30i, 30j, 30k, 30l, 30o, 30p, 30α, 30β, 30γ and 30δ) may be placed on two or more surfaces for example provided on both the upper and lower surfaces.

Turning to the second front wheel 12b, inertial actuators 30c, 30d, 30e, 30f, 30l, 30j as illustrated in FIG. 5 are positioned on the chassis and sub-frame 18 similarly to those described above in respect of the first front wheel 12a for reduction or suppression of road noise. Again, the indicated positioning represents an optional arrangement and is not limiting.

FIG. 6 illustrates a perspective view of the suspension configuration of first wheel 12a. The suspension system is a double wish bone configuration.

A seventh inertial actuator 30o is provided and is mounted upon an upper surface of the third control arm 13a, above a coil spring. Optionally the inertial actuator 30o may be placed below the coil spring.

An eighth inertial actuator 30p is placed on a suspension turret or strut tower portion (not shown) of the sub-frame 18 or vehicle body 8, adjacent to the coupling, between the sub-frame 18 and the upper control arm 13a.

Ninth and tenth optional inertial actuators 30β and 30γ are placed upon each end of the upper control arm 17a (see FIG. 6) the control arm forming an upper wish bone of the double wish bone suspension of FIG. 6

Eleventh and twelfth optional inertial actuators 30α, 30β are placed on the vehicle body 8, optionally in a suspension turret or strut tower, adjacent to a respective one of the ninth and tenth inertial actuators 30β, 30γ

Referring now to FIG. 7 there is shown alternative embodiment to the embodiment of FIG. 1 to 6. In the alternative embodiment, like numerals have, where possible, been used to denote like parts, albeit with the addition of the prefix "100" and so on to indicate that these features belong to the alternative embodiment. The alternative embodiment shares many common features, with the foregoing embodiments and therefore only the differences from the embodiments illustrated in FIGS. 1 to 8 will be described in any greater detail.

FIG. 7 illustrates an alternative suspension system. It can be seen that the Macpherson strut 113a forms an upper control arm 113a and is coupled to the vehicle body 8 or sub-frame 118, optionally in a suspension turret or strut tower.

In the embodiment of FIG. 7 the strut 113a, which comprises a coil spring and a damper, forms a rear upper control arm. The embodiment of FIG. 7 comprises an inertial actuator 130o disposed on top of the strut 113a, and a further inertial actuator 130p disposed on the sub-frame 118 (partially shown in dotted line) adjacent to the strut 113a.

It is envisaged that in alternative embodiments two or more inertial actuators may be used in place of each of the single inertial actuators 30 illustrated and described. For example a plurality of inertial actuators may be placed on the sub-frame 18, 118 or vehicle body 8 surrounding the interface between the upper control arm 13a and the sub-frame 18.

The suspension configuration may also comprise one or more anti-roll or anti-sway bars 115 as shown in FIG. 7. The anti-roll bar 115 is coupled to the second lower suspension arm 116a and to the sub-frame 118. The anti-roll bar 115 may transmit vibrations into the sub-frame 118 which are audible in the cabin 11 as road noise. Optionally, there may be provided one or more inertial actuators 130m, 130n placed on the anti-roll bar 115 and/or the sub-frame 118. Optionally, the inertial actuators 130m, 130n may be placed adjacent to or in close proximity to the point where the anti-roll bar 115 is coupled to the sub-frame 118.

Figure 8:
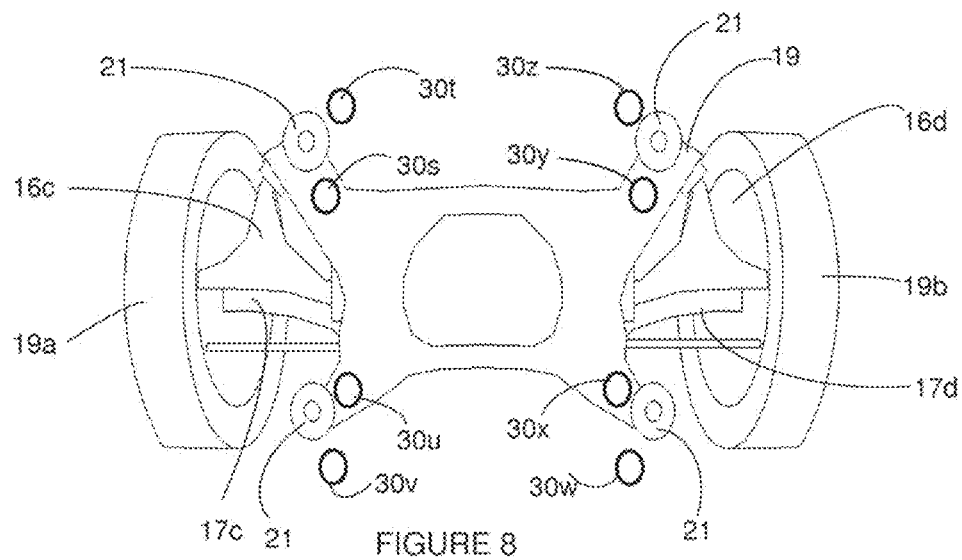
FIG. 8 corresponds to FIG. 3 and illustrates placement of the inertial actuators of FIG. 4.

FIGS. 8 and 9 illustrate further optional placement of inertial actuators (30s, 30t, 30u, 30v, 30w, 30x, 30y, 30z, 30q, 30r) upon the rear suspension system or chassis which couples the rear wheels 19a, 19b to the sub-frame 19. Four inertial actuators 30s, 30u, 30x, 30y are placed upon the sub-frame 19 adjacent to the mounting bushes 21.

Four further inertial actuators 30t, 30v, 30w and 30z are placed upon the sub-frame 18 again adjacent to the mounting bushes 21.

In the embodiment illustrated in FIGS. 8 and 9 inertial actuators 30 have not been placed upon either of the upper or lower control arms 16c, 16d, 17c, 17d. In alternative embodiments, placement of additional inertial actuators upon these components, in addition to or alternatively to those placed on the sub-frame 19 is envisaged. Furthermore, if additional suspension components are provided to couple the wheels 19a, 19b to the sub-frame 19 placement of inertial actuators 30 on these components is envisaged in other embodiments.

FIG. 9 illustrates placement of an inertial actuator 30q upon an upper portion of the control arm 113c/109c and a placement of a further inertial actuator 30r upon a strut tower, typically formed as a feature of the vehicle body 8, but may alternatively be provided by an extension of the sub-frame 18, in close proximity to the control arm 113c/109c.

Figure 10:
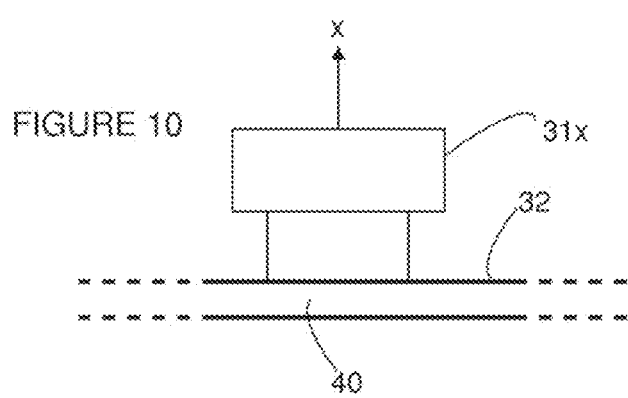
FIG. 10 is a schematic view of an inertial actuator operating in a single direction.

FIG. 10 illustrates an inertial actuator 31x affixed to a vehicle surface 40. The base plate of the actuator chassis 32 is mounted directly upon the vehicle surface 40. The inertial actuator 31x is capable of applying a force to the vehicle surface 40.

It is envisaged that the actuator chassis 32 of the inertial actuator 31x may be secured to the vehicle surface 40 by a mechanical fixing device such as a bolt and/or by a bonding agent such as an adhesive and/or by welding and/or other suitable means.

Figure 11:
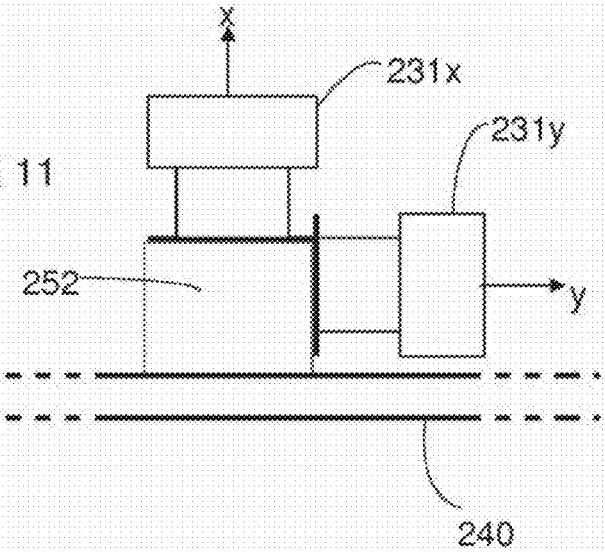
FIG. 11 is a schematic view of a pair of inertial actuators operating in two orthogonal directions.
Figure 12:
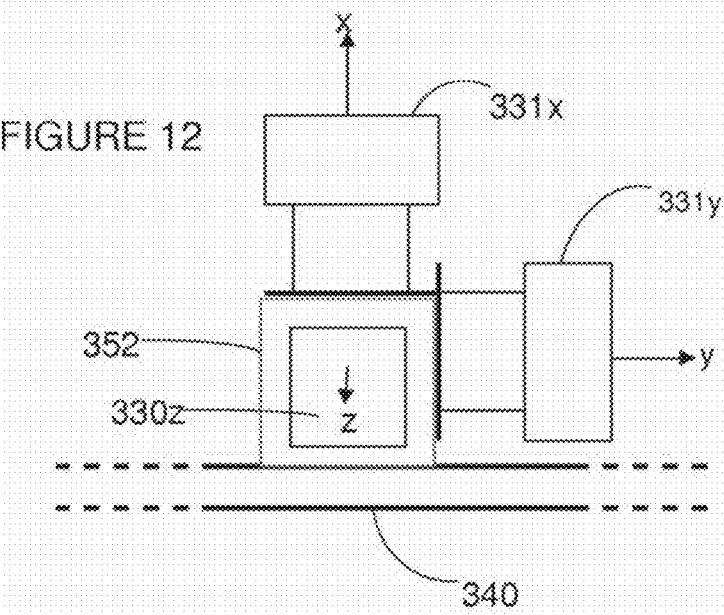
FIG. 12 is a schematic view of three inertial actuators operating in orthogonal directions.

Referring now to FIGS. 11 and 12, there is shown alternative embodiments to the embodiment of FIG. 10. In the alternative embodiments, like numerals have, where possible, been used to denote like parts, albeit with the addition of the prefix "200" or "300" and so on to indicate that these features belong to the alternative embodiments. The alternative embodiments share many common features with the first embodiment and therefore only the differences from the embodiment illustrated in FIG. 10 will be described in any greater detail.

FIG. 11 illustrates a pair of orthogonally arranged inertial actuators 231x, 231y fixed to a vehicle surface 240 via a support 252. The support 252 comprises at least a pair of orthogonal faces, a first inertial actuator 231x being fixed to a first face and a second inertial actuator 231y being fixed to a second face. The support 232 is secured to the vehicle surface 240 by suitable fixing means. In alternative embodiments, the vehicle component to which the inertial actuators 231x, 231y are secured may comprise a pair of orthogonal surfaces and inertial actuators 231x, 231y may be secured directly to a respective one of the orthogonal surfaces of the vehicle component.

FIG. 12 illustrates three inertial actuators 331x, 331y, 331z arranged orthogonally to each other. The inertial actuators 331x, 331y, 331z are mounted on orthogonal surfaces of a support 352. The support 353 is mounted upon the vehicle surface 340.

In alternative embodiments the inertial actuators 231x, 231y; 331x, 331y, 331z may be arranged at a different angular relationships to one another and need not be arranged to apply their individual forces perpendicularly to the each other.

Mounting two or more inertial actuators at angle with respect to one another enables the noise reduction system to apply a force at a non-perpendicular angle to the surface of the component to which they mounted. This may be achieved by activating two or more inertial actuators simultaneously such that the resultant force of each of the forces applied is non-perpendicular. Such an approach may be used where packaging space is at a premium, or the force required to manage the vibration exceeds the capability of a single inertial actuator. In alternative embodiments this may be achieved by activating a single inertial actuator disposed at a non-perpendicular angle to the surface of the component.

The foregoing embodiments describe an apparatus and method for reducing or suppressing the road noise audible in the vehicle cabin 11 by reducing or suppressing vibrations in the components of the vehicle 10, in particular the vehicle chassis before they are transmitted through the vehicle structure to the vehicle cabin 11. The active noise reduction system detects a vibrational force being transmitted through one or more of the chassis components and applies an opposition force to the respective one of the one or more chassis components. When the system applies an opposition force to the respective one of the one or more chassis components which is equal in magnitude and opposite in direction to the vibrational force the opposition force attenuates the vibrational force so as to at least partially cancel the vibration force; that is to say the resultant of the opposition force and the vibrational force fends to, or becomes zero. In this way the road noise transmitted through the vehicle chassis to the sub-frame 18 and/or vehicle cabin can be reduced or suppressed.

The system may be arranged or optimized to operate in the structureborne road noise range which is typically 20-500 Hz. This is a lower portion of the frequency range of human hearing which is typically 20 Hz to 20 KHz.

By mounting the inertial actuators upon the chassis components the vibrations, which would otherwise be transmitted into the sub-frame 18 and/or cabin 11 causing the audible road noise therein (the cabin and vehicle body 8 act as resonant cavity, and amplify the road noise), can be reduced or eliminated before being amplified in the vehicle body/cabin. The system disclosed herein is much simpler and more modular, that is to say components can be added or omitted to the system depending upon the particular vehicle design to improve the noise cancellation, compared to conventional noise cancellation systems which use interior speakers and microphones to cancel the noise once if arrives in the cabin. Another benefit of the present invention is that cancelling the noise (vibration) at source is more effective, and furthermore also removes the upper frequency limit drawback (typically 250 Hz) for reduction of noise levels everywhere in the cabin sometimes called the global reduction limit.

As the vibrations travel towards and through the vehicle body 8 they become more complex. For example, a single axis vibration in the sub frame 18 may translate into a multiple axis vibration in the vehicle body 8. This occurs because of the complex fittings between the sub frame 18 and the vehicle body 8. For the same reason, the orientation of the vibrations is more predictable, and the inertial actuators can be mounted so as to best reduce vibrations in the expected directions. These are two reasons why cancelling the noise (vibration) at source is more effective.

In some instances, it may not be desirable to attenuate all structure borne noise resulting from contact with the ground, but rather, to focus on only a specific band or bands or frequencies within that noise. In this way, the audible read noise within the vehicle may be tuned to improve perceived quality.

It can be appreciated that various changes may be made within the scope of the present invention, for example.

It is envisaged that inertial actuators could also be placed upon components of the vehicle chassis such as the wheel hubs, to which the wheels are attached.

Furthermore it is envisaged that the size of the inertial actuators 30 in particular the mass 34 and transducer may be adjusted to apply sufficient force to cancel or reduce the vibrations in the respective component to which they are attached.

It will be recognised that as used herein, directional references such as "top", "bottom", "front", "back", "end", "side", "Inner", "outer", "upper" and "lower" do not limit the respective features to such orientation, but merely serve to distinguish these features from one another.

The invention claimed is:

1. A vehicle comprising a vehicle body having a cabin and one or more wheels in rolling contact with a surface, the one or more wheels being coupled to the vehicle body by a chassis, and wherein two or more inertial actuators are mounted upon the chassis for suppression or cancellation of vibrations or noise in the chassis resulting from said rolling contact before transmission into the vehicle body or cabin;
   wherein the two or more inertial actuators are mounted upon a support element that is secured to a component of the chassis or vehicle body, each of the two or more inertial actuators being disposed at an angular relationship with respect one another.

2. A vehicle according to claim 1 wherein the two or more inertial actuators are arranged to reduce or suppress vibrations or noise below the frequency of 500 Hz.

3. A vehicle according to claim 1 wherein the two or more inertial actuators are arranged to reduce or suppress vibrations or noise above the frequency of 20 Hz.

4. A vehicle according to claim 1 wherein the two or more inertial actuators are placed upon the vehicle body adjacent to a coupling or joint between supports or control arms of the chassis and the vehicle body.

5. A vehicle according to claim 4 wherein the chassis comprises one or more components for coupling the wheels to the vehicle body and wherein the inertial actuators are placed on one or more or all of the components which are directly coupled to the vehicle body.

6. A vehicle according to claim 1 wherein the vehicle is a land based vehicle such as a car, van or truck.

7. A vehicle according to claim 1 wherein the two or more inertial actuators are disposed perpendicularly with respect to one another and are mounted upon orthogonal faces of the support element.

8. A method of reducing structure borne road noise audible in a vehicle cabin comprising;
   providing a vehicle having one or more wheels coupled to a vehicle body by a chassis, the chassis being coupled to the vehicle body by a coupling;
   securing two or more inertial actuators comprising a mass to the chassis and/or to a portion of the vehicle body adjacent to the or each coupling;
   actuating the mass of the inertial actuator with a transducer thereby applying a force to the chassis and/or vehicle body, thereby reducing or suppressing vibrations in the chassis and/or vehicle body;
   wherein the two or more inertial actuators are mounted upon a support element that is secured to a component of the chassis or vehicle body, each of the two or more inertial actuators being disposed at an angular relationship with respect to one another.

9. A vehicle comprising a vehicle body having a cabin and one or more wheels in rolling contact with a surface, the one or more wheels being coupled to the vehicle body by one or more supports wherein two or more inertial actuators are mounted upon at least one or each of said one or more supports for suppression or cancellation of vibration in the supports from being transmitted into the vehicle body, thereby reducing audible road noise in the cabin; each of the two or more inertial actuators being disposed at an angular relationship with respect to one another.

10. The vehicle of claim 9 wherein the two or more inertial actuators are placed upon the vehicle body adjacent to a coupling between the chassis and the vehicle body.

11. An active road noise reduction system for a vehicle comprising a vehicle body having a cabin and one or more wheels in rolling contact with a surface, the one or more wheels being coupled to the vehicle body by a chassis, the system comprising two or more inertial actuators mounted upon the chassis for suppression or cancellation of vibrations or noise in the chassis resulting from said rolling contact before transmission into the vehicle body or cabin;

wherein each of the two or more inertial actuators are mounted upon a support element that is secured to a component of the chassis or vehicle body, each of the two or more inertial actuators being disposed at an angular relationship with respect to one another.

\* \* \* \* \*